US005656489A

United States Patent [19]

Fallon

[11] Patent Number: 5,656,489
[45] Date of Patent: Aug. 12, 1997

[54] METHOD FOR THE REMEDIATION OF ORGANOLEADS ESPECIALLY TETRAETHYLLEAD (TEL) IN CONTAMINATED NATURAL MEDIA

[75] Inventor: Robert Donald Fallon, Elkton, Md.

[73] Assignee: E. I. Du Pont de Nemours and Company, Wilmington, Del.

[21] Appl. No.: 592,243

[22] Filed: Jan. 26, 1996

Related U.S. Application Data

[63] Continuation of Ser. No. 260,144, Jun. 15, 1994, abandoned, which is a continuation-in-part of Ser. No. 918,821, Jul. 22, 1992, abandoned.

[51] Int. Cl.$^6$ ................................................. C02F 3/28
[52] U.S. Cl. .............................. 435/262.5; 435/262
[58] Field of Search ............................ 435/262, 262.5

[56] References Cited

U.S. PATENT DOCUMENTS

| | | | |
|---|---|---|---|
| 3,846,290 | 11/1974 | Raymond | 210/31 |
| 4,447,541 | 5/1984 | Peterson | 435/264 |
| 4,493,895 | 1/1985 | Colaruotolo et al. | 435/262 |
| 4,511,657 | 4/1985 | Colaruotolo et al. | 435/253 |
| 4,519,913 | 5/1985 | Baldwin et al. | 210/611 |
| 4,535,061 | 8/1985 | Chakrabarty et al. | 435/253 |
| 4,588,506 | 5/1986 | Raymond et al. | 210/606 |
| 4,758,345 | 7/1988 | Francis et al. | 210/611 |
| 4,826,602 | 5/1989 | Revis et al. | 210/611 |
| 4,871,673 | 10/1989 | Rehm et al. | 435/262 |

FOREIGN PATENT DOCUMENTS

| | | | |
|---|---|---|---|
| 0 519 987 | 6/1992 | European Pat. Off. | B09B 3/00 |
| 3 621 313 | 6/1986 | Germany . | |

OTHER PUBLICATIONS

Thayer, Aug. 26, 1991, C&EN, pp. 23–44.
Madsen, et al *Science*, 252, 830–833 (1991).
Thomas et al, *Environ. Sci. Technol.*, 23(7), 760–766 (1989).
Hewitt et al, *Analytica Chimica Acta*, 167, 277–287 (1985).
Macaskie et al, *Environmental Tech. Letters*, 6, 237–250 (1985).
Macaskie et al, *Environmental Tech. Letters*, 8, 635–640 (1987).
Bushee et al, *Analytica Chimica Acta*, 194, 235–245 (1987).
Folsom et al, *Applied Environmental Microbiology*, 1602–1608 (1991).
WPAT Accession No. 88–014972/03, Abstract for DE–3621313, in English.

*Primary Examiner*—Carolyn Paden

[57] ABSTRACT

In contaminated media, transformation of organoleads, especially tetraethyllead, into inorganic form is achieved by stimulation of indigenous microbial populations. Complex biological extracts and other nutrient amendments promote microbial activity under aerobic or anaerobic conditions. Under anaerobic conditions, sulfide production by sulfate reducing bacteria is especially promoted. Transformation to the inorganic form reduces lead toxicity and mobility in ground water supplies.

24 Claims, 10 Drawing Sheets

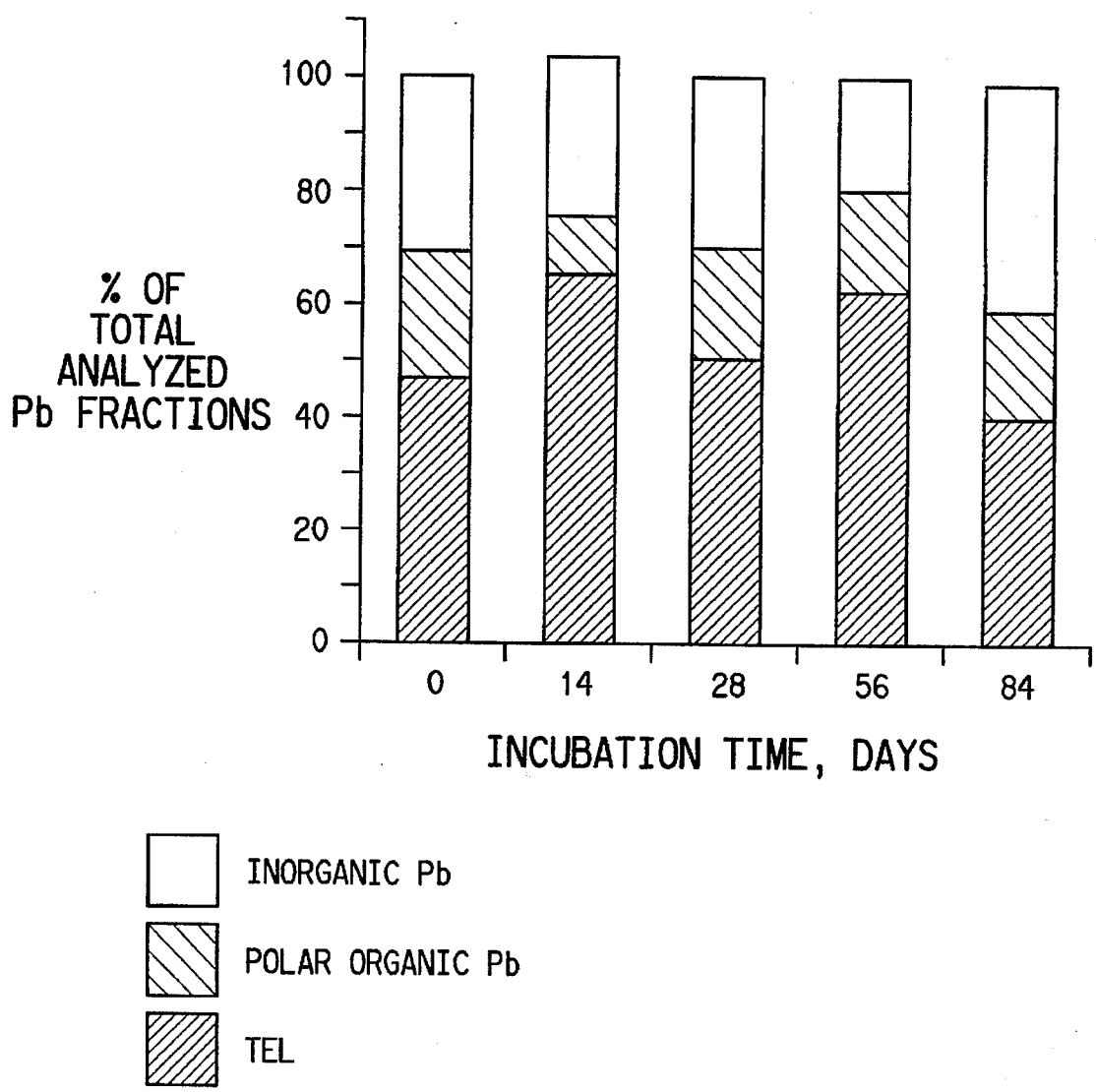

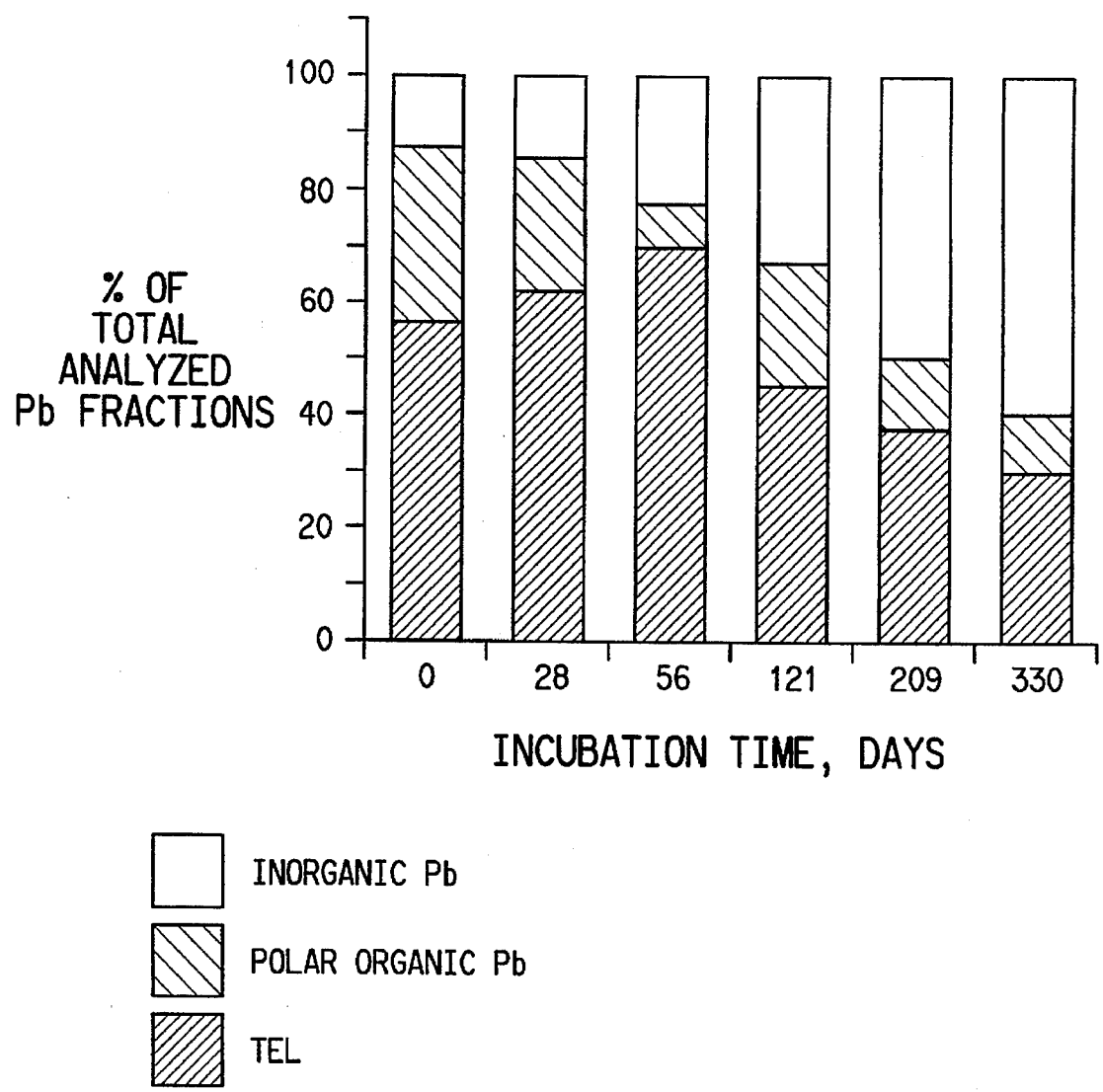

METHOD FOR THE REMEDIATION OF ORGANOLEADS ESPECIALLY TETRAETHYLLEAD (TEL) IN CONTAMINATED NATURAL MEDIA

This is a file-wrapper continuation of Ser. No. 08/260, 144, filed on Jun. 15, 1994 now abandoned which is a continuation-in-part of Ser. No. 07/918,821, filed on Jul. 22, 1992 now abandoned.

FIELD OF INVENTION

This invention describes a process for promoting the degradation of tetraethyllead and other organometal compounds (specifically organolead) in contaminated media via the stimulation of indigenous microflora. The process is based on the stimulation of microbes by periodic addition of dilute solutions of complex biological extracts to the contaminated media. This process results in the enhancement of a population of microbes with the ability to transform organolead compounds into insoluble inorganic metals.

BACKGROUND OF THE INVENTION

Organometallic compounds include a number of highly toxic manufactured chemicals including organoarsenic, and organotin compounds used as pesticides or herbicides, as well as nickel tetracarbonyl and tetraethyllead produced as by-products of the petroleum industry. Trace elements such as platinum, mercury, cadmium, and lead used in the plating industry are often processed to organometallic form before being jettisoned in industrial waste streams.

Alkyl leads, especially tetraethyllead (TEL), represent a typical example of organometals described above. Handling practices at some manufacturing facilities have resulted in soil and ground water contamination by TEL and other alkyl leads. These compounds are highly toxic to the environment and detrimental to human health. TEL causes serious human health effects at doses of less than 10 mg/kg body weight and many TEL decomposition products (e.g., triethyl lead chloride) are also known to be toxic to humans. Many decomposition products are also quite water soluble making it possible for them to be carried long distances in ground water. Because many of the inorganic lead salts resulting from complete decomposition of TEL are relatively insoluble in water, inorganic lead (elemental symbol=Pb) has been identified as one of the more desirable decomposition products with regard to reducing soluble lead levels in the contaminated ground water. Organometals such as TEL generally show higher environmental mobility and/or greater toxicity than inorganic forms. It is environmentally beneficial to transform these organometals into their inorganic forms in order to prevent contamination of water supplies. Biological enzymatic activity is one such route to these transformations.

A number of methods have been described to remediate soil and ground water containing toxic chemicals. Colaruotolo et al. (U.S. Pat. No. 4,511,657) claim the use of specially adapted microbial cultures to treat obnoxious waste, especially halogenated organic chemical waste (U.S. Pat. No. 4,493,895). Methods for treating soil contaminated with toxic chemicals have also been described. Rehm and Kirchner (U.S. Pat. No. 4,871,673) claim the use of specially adapted microorganisms affixed to a porous, adsorptive carrier for the decontamination of soil. Chakrabarty and Kellogg (U.S. Pat. No. 4,535,061) claim the use of $Pseudomonas\ cepacia$ ATCC 39027 and a mixed culture of Arthrobacter and Pseudomonas ATCC 39028 for the dissimulation of environmentally persistent chemical compounds in both soil and water. Peterson (U.S. Pat. No. 4,447,541) claims the use of a two part reagent mixture for hydrolyzing polyhalogenated organic compounds with subsequent biological removal of the hydrolysis products.

The use of bioreactors and in-situ stimulation of indigenous microflora are two current approaches to the decontamination of soil and ground water. Bioreactors have been designed to utilize microorganisms for the bioremediation of a variety of toxic contaminants, including trichloroethylene, phenol, and toluene. (Folsom et al., 1991, *Applied and Environmental Microbiology*, 57:1602–1608). In-situ bioremediation involves the growth of indigenous, contaminant-degrading microorganisms which are enhanced by adding nutrients and oxygen. Raymond (U.S. Pat. No. 3,846,290 and U.S. Pat. No. 4,588,506) claims a process in which oxygen and nutrients are supplied to biota for stimulating the biooxidation of hydrocarbons contaminating ground water without the addition of microorganisms to the contaminated environment. Other methods of in-situ bioremediation have targeted halogenated organic compounds such as trichloroethylene, vinyl chloride, and chloroform (Thomas et al., 1989, *Environ. Sci. Technol.*, 23:760–766) and aromatic and polyaromatic hydrocarbons such as naphthalene and phenathrene. (Madsen et al., 1991, *Science*, 2:830–833).

Revis et al. (U.S. Pat. No. 4,826,602) claim that contacting aqueous waste with a culture of *Pseudomonas maltophilica* ATCC 53510 will reduce the concentration of ionic species of heavy metals. Macaskie (Macaskie et al., 1987, *Environ. Technol. Lett.*, 8:635–640) has reported that alkyllead tolerant yeast strains derived from *Candida humicola* are able to degrade trimethyllead to inorganic lead. However, documented degradation of tetramethyllead in soil is not previously known in the art.

The methods cited above are useful and clearly show that microorganisms can be used to remove toxic compounds from both soil and aqueous environments. There are however, several disadvantages to the methods outlined in the existing art. Examples given in the art describe decontamination of the environment using specific naturally occurring, or genetically engineered cultures of bacteria or yeast or the preliminary harsh chemical treatment of toxic contaminants prior to biological treatment by indigenous microbes. It should be noted that chemical treatment of the contaminated area is likely to kill the majority of the indigenous microbial flora and thus impede any subsequent remediation effort. Furthermore, the isolation or engineering, culturing, and inoculation of specific microorganisms particularly selected for the degradation of specific organic contaminants is labor intensive and time consuming. Bioreactors can allow for effective microbial growth with greater control over nutrient addition, temperature, pH, and concentration; however, in bioremediation projects, materials must be pumped out or excavated, and soils must be handled and sorted which is also labor intensive. Bioremediation efforts that utilize in-situ methods have been effective in degrading certain toxic compounds; however, they have not addressed the specific problem of organometal contamination.

It has not been clear in the prior art how to stimulate such transformations in natural microbial populations. Toxicity of the organometal contaminants to microbes is a potential problem in any scheme for biological transformation of organometals, (Macaskie et al., 1985, *Environmental Technology Letters*, 6:237–250) and stimulation of indigenous microbial populations naturally adapted to the toxic organometals provides a distinct advantage over the art.

Furthermore, in the few attempts at demonstrating microbial organolead transformation in pure cultures, reports generally show such activity to be barely detectable (e.g., Macaskie and Dean, 1987, *Environmental Technology Letters*, 8:635–640). The methods proposed here of utilizing microbial flora indigenous to the contaminated area to effect biotransformation of toxic organolead compounds eliminate the need for isolation or engineering of specific microorganisms and clearly demonstrate a statistically significant increase in the level of transformation of organolead compounds. Thus, the present invention provides a process whereby toxic compounds, and specifically organolead such as TEL, are converted to inorganic species via stimulation of the indigenous microbial population of the contaminated area.

SUMMARY OF THE INVENTION

A process is described for promoting the decomposition of organolead compounds in contaminated media via stimulation of indigenous microflora, comprising the steps of:

(i) determining the starting concentration of indigenous microorganisms in the contaminated medium;

(ii) stimulating the growth of the indigenous microorganisms by adding an initial addition of an effective amount of nutrients, the nutrients selected from the group consisting of a carbon source, a nitrogen source, an oxygen source, a phosphate source and a sulfate source such that the indigenous microorganisms reach a concentration of from 10 to 100,000 times that of the starting concentration and the permeability of the contaminated medium is greater than or equal to $10^{-4}$ cm/second permitting waterflow whereby the microorganisms degrade the organolead species to inorganic lead; and (iii) making supplemental additions of nutrients at periodic intervals, as needed, ranging from once every 3 days to once every 3 months at concentrations necessary to maintain the indigenous microflora in a stimulated state. Maintenance of microbes in the contaminated substrate at concentrations ten-fold or higher than that found prior to the additions of the nutrient mixture is achieved by this stimulation.

The invention is comprised of two different embodiments under which microbial stimulation is achieved:

(1) The aerobic embodiment comprises the nutrient addition regime described above under conditions where aerobic microflora are stimulated. This is achieved by maintaining oxygen availability to the stimulated microbes. Oxygen availability can be insured by the pulsed additions of an oxygen source such as hydrogen peroxide to the contaminated media, if necessary.

(2) The anaerobic embodiment comprises the nutrient addition regime described above under conditions where anaerobic bacteria, especially sulfate reducing bacteria, are stimulated. This is achieved by pulsed additions of a supplemental, defined carbon source which stimulates the growth of sulfate reducing bacteria in the contaminated media. The supplemental carbon source can be chosen from a well known group of carbon sources which support growth of sulfate reducing bacteria (Pfennig, N., Widdel, F., Truper, H. G., 1981, *The Prokaryotes*, Ch. 74) such as lactic acid, pyruvic acid, fumaric acid, malic acid, citric acid, propionic acid, butyric acid, caproic acid, benzoic acid, succinic acid, the sodium or potassium salt of each acid, ethanol, glucose, or combinations thereof. In addition to supplement natural concentrations of sulfate, pulsed additions of a source of soluble sulfate may be made, if necessary, in order to ensure adequate concentrations of sulfate for stimulation of the sulfate reducing bacteria.

BRIEF DESCRIPTION OF THE DRAWINGS

FIG. 2b shows the effect of an unstimulated microbial population on the distribution of lead in organic and inorganic fractions over time in TEL contaminated ground water and subsoil taken from site A.

FIG. 6a shows the effect of a stimulated microbial population under anaerobic conditions on the distribution of lead in organic and inorganic fractions over time in TEL contaminated ground water and subsoil taken from site B.

DETAILED DESCRIPTION OF THE INVENTION

Figure 1:
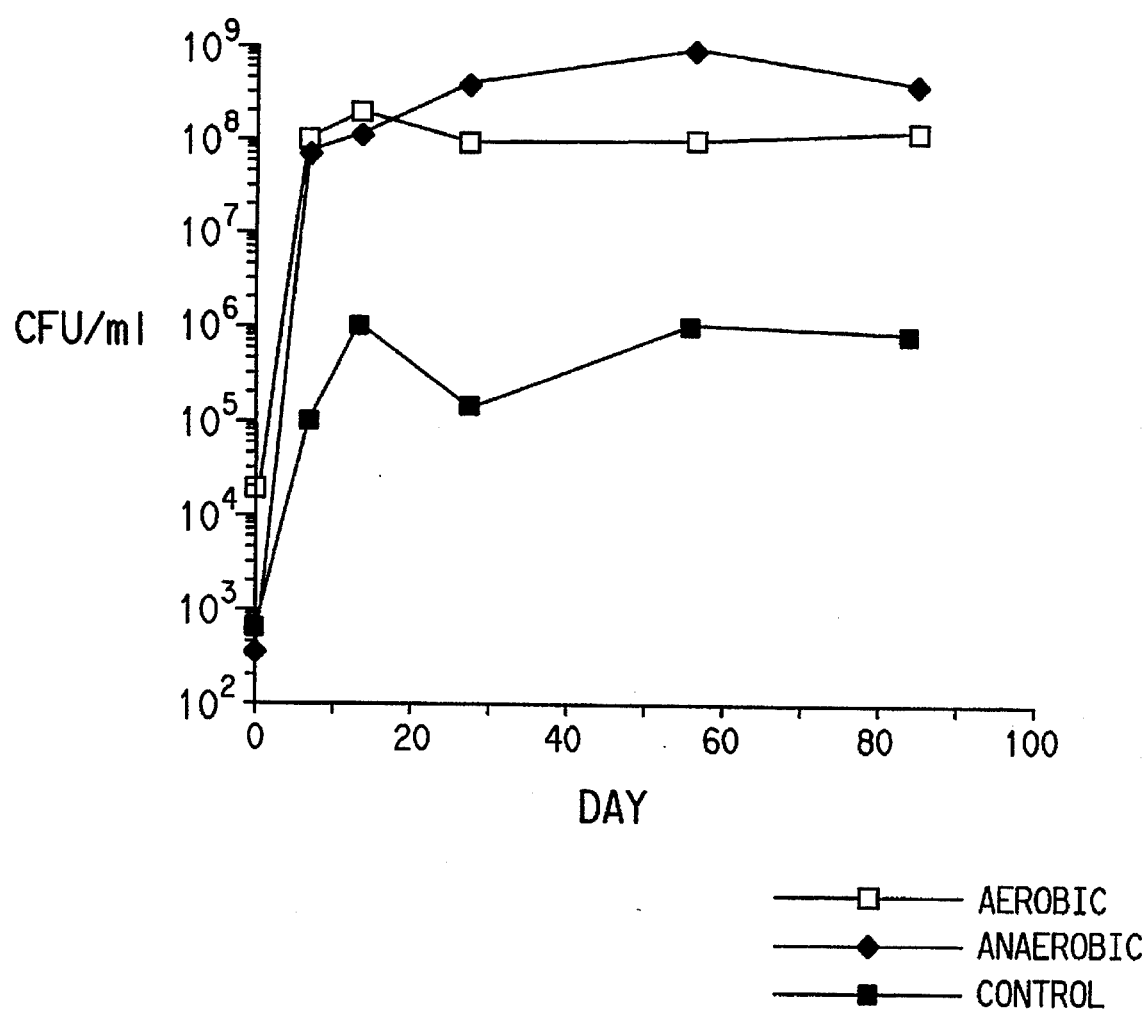
FIG. 1 shows changes in microbial cell numbers in contaminated ground water and subsoil taken from site A, an industrial site in New Jersey contaminated with tetraethyllead. These microbial cells were stimulated with the nutrient mixture and incubations were done in the laboratory under aerobic or anaerobic conditions. The unamended treatment reflects what would be expected in the absence of Applicants' invention.

In the context of this disclosure a number of terms shall be utilized.

The term "organometals" may include any materials of the formula $R_nM_m$ where R is defined as: $C_1$–$C_{20}$, alkyl, or aryl, and where n=1–6, and where M is a metal or metalloid with bonding electron behavior of the "borderline" type including Ti, V, Cr, Mn, Fe, Co, Ni, Cu, Zn, Ga, Cd, In, Sn, Sb, As, and Pb, and where m=1–2.

For the purposes of this disclosure, "borderline" metal ions are those that will form a metal ion:ligand complex without strong preferences for the ligand partner. For example, metal ions may be classified into three groupings according to their Class A ions, Class B ions and borderline ions. Class A metal ions have the following order of preference for their ligand partners: F>Cl>Br>I, N>As, and S>N>O. In contrast, Class B metal ions prefer a reverse order of partners: I>Br>Cl>F, As>N, and S>N>O. Borderline metal ions form an intermediate group without any such preference (Nieboer and Richardson 1980, *Environ. Pollut.*, (ser. B), 1:3).

The terms "organolead" and "organic lead" refer to any chemical compound containing lead bound to a carbon-containing molecule by a covalent bond with the formula $R_nPbm$, where R is defined as $C_1$–$C_{20}$, alkyl or aryl, and where n=1–6, Pb is lead; and m=1–2. Tetraethyllead, $Pb(C_b2H_5)_4$, is a typical example of an organolead. Tetraethyllead is similar to a large class of alkylated metal and metalloid compounds which are known to be subject to biological modification. This group of metals and metalloids includes mercury, arsenic, selenium, thallium, tellurium, and tin (P. J. Craig, Environmental Aspects of Organometallic Chemistry, 198, 979–1020 In Comprehensive Organometallic Chemistry, V. 2, Wilkinson, G., Sone, FGA, & Abel, EW (ed.), Pergamon Press). By "biological modification" is meant the degradation of metal-containing chemical species by microorganisms. Because of the outer shell electron configurations, metals from this group are expected to behave in a generally similar manner in biological reactions.

The term "polar organic lead" will refer to lead that is complexed (covalently bonded) to a carbon-containing molecule where the organic lead molecule is an ionized species and is soluble in water at pH 9.1, for example, $Pb(C_2H_5)_{3+}$.

The term "inorganic lead" will refer to lead complexed with non-carbon containing species and insoluble in water at pH 9.1.

"Contaminant(s)" is (are) defined as undesired constituent (s) which have tainted an otherwise desirable material.

"Contaminated substrate" is defined as the matrix within which the contaminant is contained. Examples include both solid and aqueous phases.

"Microbial stimulation" is defined as an increase in microbial numbers in samples of contaminated material incubated in the presence of the complex biological extracts. Such stimulation increases the concentration of the indigenous microorganisms from a starting concentration, which at a minimum may be as low as 10 cells/mL, to a preferred range of microorganisms of 1,000,000 to 100,000,000 cells/mL, with a more preferred concentration being 10,000,000 cells/mL.

"Samples" are defined as small batches removed from the location of interest that can be easily manipulated on a laboratory scale.

A "pulsed addition" or "perodic addition" is defined as any addition repeated as needed and includes "supplemental amounts" of nutrients.

The "nutrient mixture" is defined as a mixture containing a combination of biological extracts, phosphate, nitrogen and may or may not include trace metals, hydrogen peroxide, sulfate, and organic compounds that are especially suited for growth of sulfate reducing organisms.

"Biological extract" refers to any biological source that results in a mix of diverse metabolizable, organic compounds and assorted intracellular material.

"Complex biological extracts" may comprise wastes from food or agricultural processing (e.g., whey), commercially available preparations (e.g., beef extract, yeast extract), and custom prepared extracts which might be inexpensively derived from solid waste (e.g., farming wastes).

"Metabolizable compounds" are defined as compounds that can be modified by living microbial organisms by means of 1) the building of more complex molecules (anabolism) or 2) the breakdown of molecules to provide energy (catabolism). In these ways, the microorganism transforms one compound to another.

"Hydraulic conductivity" or "permeability", K, is defined by Darcy's equation as $K=vL/\Delta P$ where v=the Darcy velocity (length/time), L=distance over which flow occurs (length), $\Delta P$=Net pressure drop across the flow distance (length). K is expressed in length/time units. Where water flow through porous media is desired, it is necessary to have a permability value of $10^{-4}$ cm/sec or greater.

The invention provides a method for the degradation of organolead in contaminated media and is of greatest utility in situations where organolead has contaminated subsoil or ground water, but might be used in any situation where the growth of microbial populations can be stimulated in the presence of an organolead contaminant. Generally, the lessening of metal toxicity and mobility due to the degradation of the organic fraction of the organolead is the primary advantage of the invention.

The techniques demonstrated in the examples can be used in field situations where organolead is to be removed from subsoil/ground water.

Generally, three major steps are involved in this process: (1) feasibility; (2) preparation; and (3) implementation.

Step 1—Preliminary Evaluation

Applicants have demonstrated in the examples below that the invention can be applied in widely differing soil environments. However, variations in the chemistry found in different soils indicate a preliminary evaluation in order to optimize the invention for a specific location.

Samples of ground water and soil are collected from the contaminated site and brought to the laboratory. Nutrient additions are made to the samples.

Aerobic and/or anaerobic conditions are tested. Bacterial numbers, the physical/chemical behavior of the subsoil/ground water mix, and the changes in organolead concentrations are monitored. Results from these incubations allow the operator to predict field results including, but not limited to, (1) nutrient additions necessary for proper microbial stimulation, (2) potential for undesirable changes in soil due to nutrient stimulation of the microbes, and (3) rates of transformation of the organolead compound(s).

Step 2—Preparation

Engineering modifications are made at the site that allow periodic delivery of nutrients to contaminated subsoil/ground water locations and monitoring of the contaminated subsoil/ground water locations.

Step 3—Implementation

Based on predictions from the feasibility study (Step 1), appropriate nutrients are delivered to the contaminated subsoil/ground water locations at appropriate rates and concentrations. This results in stimulation of the subsoil/ground water microbes which increase in numbers and metabolic activity. This stimulation is monitored in the subsoil/ground water using techniques found in "Standard Methods for the Examination of Water and Waste Water", 1985, 16th Edition.

The resulting transformation of organolead into inorganic lead is monitored in the subsoil/ground water using the lead fractionation techniques described in Example 1 or similar fractionation techniques available for other metal compounds. Examples of the fractionation techniques for other metals may be found in "Organometals and metalloids:occurence and fate in the environment" (F. E. Brinkman and J. M. Bellama, ed., 1978) or "Analytical techniques for heavy metals in biological fluids" (S. Facchetti, ed., 1983). The treatment is stopped when reduction in organolead concentration reaches an appropriate level in the subsoil/ground water.

The first embodiment of the invention is the stimulation of microbes in the presence of oxygen. This embodiment will be referred to as the "aerobic embodiment" resulting in the lowering of the organolead concentration in the contaminated medium to a level less than that of the starting concentration.

In the aerobic embodiment, the aqueous phase in contact with the microbes is enriched with a soluble source of phosphorous to a final concentration in the range of 0.09–9 mMolar(mM) $PO_4$ and most preferably 0.9 mM. The aqueous phase in contact with the microbes is enriched with a source of soluble nitrogen to a final concentration in the range of 0.26–26 mM nitrogen and most preferably 2.6 mM nitrogen. The aqueous phase in contact with the microbes is enriched with a complex biological extract to a final concentration in the range of 2 to 2000 parts per million (ppm, extract dry weight solids basis) and most preferably 20 ppm. To ensure the presence of oxygen, an oxygen source is added to a final concentration of 30–300 ppm and most preferably 60 ppm. Any oxygen source compatible with microbial growth is acceptable, but hydrogen peroxide ($H_2O_2$) is preferred. The pulsed addition of these components of the nutrient mixture are made as needed over intervals ranging from once every 3 days to 3 months where the most preferred is once every 14 days. Use of such extracts has the advantage that a diverse microbial population is stimulated rather than a population of limited diversity which would be expected from stimulation by addition of single, pure organic compounds.

The second embodiment of the invention is the stimulation of microbes in the absence of oxygen which will be referred to as the anaerobic embodiment resulting in the lowering of the organolead concentration in the contaminated medium to a level less than that of the starting concentration. The anaerobic embodiment operates under identical conditions as the aerobic embodiment with the following modifications: (1) no oxygen source is provided (e.g., $H_2O_2$); (2) defined carbon sources, including pyruvate, lactate, fumarate, malate, ethanol, glucose, citrate, propionate, butyrate, caproate, benzoate, or succinate are added to stimulate sulfate reducing bacteria, (3) dissolved sulfate concentrations in the aquifer are supplemented, if needed, to approximately 50 ppm (*Standard Methods for the Examination of Water and Wastewater*, 16th Edition, 1985, Part 426C). For the modifications outlined, organic acids may be added as either the free acid or the salt to final concentrations in the range of 3–3000 ppm, most preferably 300 ppm. In addition, any water soluble source of sulfate is acceptable for sulfate supplementation with ferrous sulfate being most preferred. Modifications (2) and (3) are specifically designed to promote biological sulfate reduction in the contaminated media. Sulfate reduction by bacteria produces sulfide from sulfate. Sulfide reacts with polar organic lead to promote the conversion to inorganic lead (Jarvie, A. W. P., R. N. Markall, and H. R. Potter, 1981, *Environmental Research*, 25:241–249; Jarvie, A. W. P., A. P. Whitmore, R. N. Markall, and H. R. Potter, 1983, *Environmental Pollution* (Series B) 69–79). In addition, sulfide leads to formation of insoluble lead sulfide precipitates in the presence of inorganic lead. This helps drive the reaction in the desired direction, toward inorganic lead, and reduces soluble lead concentrations in the ground water supply. Similar reactions are expected with other organometals since most metals of the "borderline" type (Nieboer and Richardson, 1980, *Environ. Pollut.*, (ser. B) 1:3) form insoluble sulfide precipitates.

For both embodiments, preferred values and ranges are given for concentrations and frequency of pulsed additions because the invention may be applied under a variety of field situations. The goal is to balance the concentration of the additions and the frequency at which they are added to the contaminated media such that (1) concentrations of microbial cells increase 10–100,000 fold as measured by the spread plate method (*Standard Methods for the Examination of Water and Wastewater*, 16th Edition, 1985, Part 907) (2) permeability of the contaminated media remains over $10^{-4}$ cm/sec, so that flow may be maintained through the media, and (3) in the case of the anaerobic embodiment, biological sulfate reduction occurs in the media.

The exact mechanism whereby organoleads such as TEL are degraded by the process of the instant invention is not entirely clear; however, it is certain that the process results in several different forms of lead and from that information, a degradation pathway might be postulated. It is likely that the first step in the process is the demethylation of the organic lead species by microbial enzymatic systems resulting in the formation of various polar organic lead species. These polar organic lead species are soluble in water at pH 9.1 and are formed by the replacing of organic groups with ions in the environment such as chloride. Further degradation of the polar organic lead species results in the formation of inorganic lead species such as lead chloride or lead hydroxide. Inorganic lead species will generally precipitate out of aqueous solution near neutral pH, resulting a reduction in metal contamination of ground water supplies.

All lead fractions are operationally defined according to the analysis scheme in Example 1. Lead analyses of the fractionated material proceeded via nitric acid digestion followed by colorimetric lead analysis as the dithizone-lead complex (*Standard Methods for the Examination of Water and Wastewater*, 16th Edition, 1985, Part 316 D). Three lead fractions and total lead were sampled at each time point. It is important to note that there are other methods of determining levels of organic and inorganic species of lead and the method used here was chosen in anticipation for use in the field. Hewitt (Hewitt et al., 1985, *Analytica Chimica Acta*, 167:277–287) reports a method of determining five tetraalkyllead compounds based on collection of the analytes on a porous polymer film and a two stage thermal desorption, separation by gas chromatography and detection by modified flame atomic absorption spectrometry. Busbee (Busbee et al., 1987, *Analytica Chimica Acta*, 194:235–245) describes a method for detecting organolead species involving $C_{18}$ HPLC separation and subsequent detection via UV spectrometry.

Specific leads found in the contaminated ground water were TEL, triethylmethyllead, and dileadalkyls. The invention can reasonably degrade any organolead compound to inorganic lead based on the evidence of degradation of the above three compounds.

Numbers of bacteria present in the microcosms was determined by the spread plate procedure (*Standard Meth-* ods for the Examination of Water and Wastewater, 16th Edition, 1985, Part 907). Colony forming units indicate the number of live microbial cells/ml of sample (colonies per plate/volume plated=colony forming units/mL sample).

A black precipitate, indicative of metal sulfide precipitates, was observed in all anaerobic treatments. This is expected as a typical result of the addition of nutrients and ferrous sulfate to ground water environments under anaerobic conditions due to the formation of sulfide by the sulfate reducing bacteria.

EXAMPLE 1

Aerobic Laboratory Microcosm with Site A Ground Water & Soil

I. Sample Collection

Samples of ground water with small amounts of subsoil were collected from a site where ground water and soil was contaminated with tetraethyllead.

II. Lead Fractionation

In order to determine the lead levels of various samples both before, during, and after incubation with microorganisms, it was necessary to have procedures capable of determining levels of total lead, tetraethyllead, polar organic lead, operationally defined as water soluble lead at pH 9.1 and inorganic lead, operationally defined as water insoluble lead at pH 9.1.

Total lead was determined as follows. 20 ml aliquots from each sample to be tested were removed into 50 ml polyethylene bottles and 1 ml reagent grade 70% nitric acid and 1 ml 1N ICI reagent was added to each bottle. ICI reagent consisted of 1778 ml 25% KI plus 1778 ml concentrated HCL and 300 g $KIO_3$. Samples were stored at 4° C. until total lead determinations could be made. Total lead concentrations were determined by colorimetric lead analysis as the dithizone-lead complex (*Standard Methods for the Examination of Water and Wastewater*, 16th Edition, 1985, Part 316 B).

To determine concentration of tetraethyllead, 20 ml aliquots were again removed form each sample to be tested, into an acid washed 125 ml boiling flask. To each flask was added 20 ml ethylene dichloride (EDC) and the flask was shaken for 1 hr at full speed on a wrist action shaker (Burrell Scientific, Inc., Pittsburgh, Pa.) at room temperature. After 1 hr, the EDC phase was removed and filtered through a Whatman GF/D filter (Whatman Scientific, Ltd., Kent, England) at <5 psi vacuum, and the aqueous phase was washed with a second 20 ml aliquot of EDC. The EDC was then filtered as above with the exception that it was allowed to stand for 5 minutes before the vacuum was applied. Both filtered EDC fractions were combined and fresh EDC was added to correct for evaporation losses during handling, bringing the volume to 20 ml. The combined EDC phases were stored at 4° C. in amber glass bottle and sealed with Teflon caps (Pierce Chemical Co., Rockford, Ill.) until lead levels could be determined via the colorimetric method described above.

To determine levels of polar organic lead and inorganic lead, the above EDC treated aqueous phase was transferred back to the original 125 ml boiling flask and 50 ul of Cresol Red indicator was added to each sample. The pH was adjusted with 0.1M NaOH until the indicator turned red (about 1–2.5 ml) and the pH was confirmed to be about 8.9 to 9.1 by standard methods. The samples were permitted to stand at room temperature for 60 minutes to allow inorganic lead hydroxide precipitates to form. After 1 hr, the samples were filtered through a combination Whatman GFD and Gelman GN-6 0.45 um filter at low vacuum. 15 ml of the aqueous filtrate containing the polar organic lead was transferred to a 50 ml polyethylene bottle to which 0.75 ml 70% nitric acid plus 1.5 ml 1N ICI solutions was added and soluble lead levels were determined via the colorimetric method described above.

To determine levels of inorganic lead the solid materials trapped by the filtering of the EDC steps and the precipitation steps were combined and placed in a 50 ml polyethylene bottle with 10 ml deionized water containing 0.4 ml 70% nitric acid and 1 ml 1N ICI solution. Lead levels in fraction were determined by the colorimetric method described above. These individual lead analyses on the tetraethyllead, polar organic lead, and inorganic lead fractions allowed the transformation process embodied in the invention to be monitored in the following examples.

A typical analysis of the TEL fraction in the contaminated ground water was 96.4% TEL, 2.2% triethylmethyllead, and 1.4% dileadalkyls. The total concentration of TEL, triethylmethyllead and dileadalkyls was less than 6 mg Pb/L. The total concentration of total lead (including non-polar (TEL, etc.), polar, and inorganic lead) was less than 9 mg Pb/L.

III. Incubation and Pulse Addition of Nutrients

Ground water with a small amount of subsoil was incubated under static (non-shaking) conditions in a glass container in the dark at room temperature for 84 days. Various nutrient mixture additions were made at the start of the laboratory incubation and periodically over the incubation period as follows:

300 ml total volume at start of incubation

Day 0—0.6 mL sterile 7% (w/v) $NaH_2PO_4$ solution+0.6 mL 7% (w/v) $NH_4Cl$ solution+0.6 mL 10% (w/v) Difco yeast extract+0.1 mL of 16.67% $H_2O_2$+0.3 mL of a 10% (w/v) garden soil slurry Day 7—0.6 mL sterile 7% (w/v) $NaH_2PO_4$ solution+0.6 mL 7% (w/v) $NH_4Cl$ solution+0.6 mL 10% (w/v) Difco yeast extract+0.1 mL of 16.67% $H_2O_2$+0.3 mL of a 10% (w/v) garden soil slurry Day 28, Day 70—0.6 mL 10% (w/v) Difco yeast extract+ 0.1 mL of 16.67% $H_2O_2$.

Day 70—0.6 mL 10% (w/v) Difco yeast extract+0.1 mL of 16.67% $H_2O_2$

A control incubation with ground water from the same site allowed changes occurring in the absence of nutrient stimulation to be evaluated. The control was handled in exactly the same manner as the experimental incubation except no nutrient additions were made.

Control: 500 ml total volume at start of incubation

Day 0—0.5 mL of sterilized 10% garden soil slurry

Both incubations were periodically analyzed for the types of lead compounds present using the procedures outlined in Step I.

IV. Results

As shown in FIG. 1 bacterial numbers attained levels of between $10^8$ and $10^9$ colony forming units (CFU) for amended cultures while only attaining levels of about $10_6$ CFU for unamended cultures.

Figure 2A:
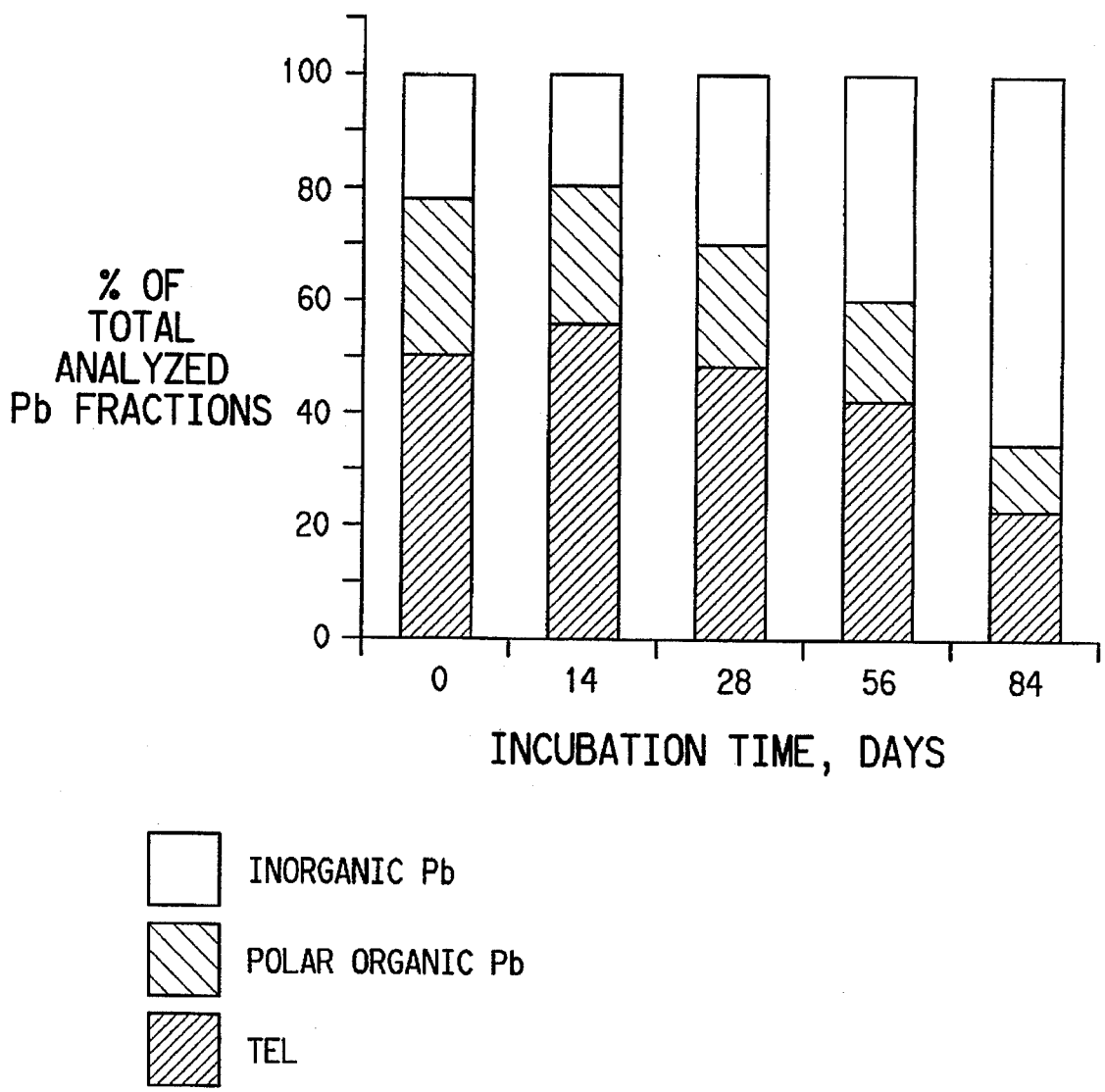
FIG. 2a shows the effect of a stimulated microbial population under aerobic conditions on the distribution of lead in organic and inorganic fractions over time in TEL contaminated ground water and subsoil taken from site A.

In this aerobic treatment, the percentage of total lead contributed by tetraethyllead declined more than two-fold from 51% to 24% and polar organic lead declined from 26% to 9% (FIG. 2a). The percentage of total lead as inorganic lead was seen to increase approximately three-fold from 22% to 66% (FIG. 2a).

The relative changes in the distribution of lead fractions were noticeably less in the control sample where nutrient stimulation was absent (FIG. 2b). Here the percentage of total lead contributed by tetraethyllead declined from 46% to 40.5% and polar organic lead declined from 30.9% to 16.1% (FIG. 2b). The percentage of total lead as inorganic lead increased from 23% to 41.8% (FIG. 2b).

EXAMPLE 2

Aerobic Laboratory Microcosm with Site B Ground Water & Soil

I. Sample Collection and Lead Fractionation

Samples of ground water with a small amount of subsoil were collected from a site where ground water and soil was contaminated with tetraethyllead. Lead measurements were made at day 0 and periodically throughout the incubation as set forth in Example 1, Step II.

II. Incubation and Pulsed Nutrient Addition of Nutrients

The sample was incubated under static (non-shaking) conditions in a glass container in the dark at room temperature for 330 days. Various nutrient additions were made at the start of the laboratory incubation and periodically over the incubation period to a sample.

400 ml total volume at start of incubation

Day 0—0.8 mL 7% $NaH_2PO_4$+0.8 mL 7% $NH_4Cl$+0.8 mL 10% yeast extract+0.17 mL 33.3% $H_2O_2$+0.4 mL 10% soil slurry Day 7—0.8 mL 7% $NaH_2PO_4$+0.8 mL 7% $NH_4Cl$+0.8 mL 10% yeast extract+0.17 mL 33.3% $H_2O_2$ Day 14—2 mL from unamended treatment Day 21—5 mL of a three day 1% yeast extract mixed culture, $8 \times 10^8$ cells/mL, from garden soil Days 28, 56, 84, 115, 136, 147—0.6 mL 10% Difco yeast extract+0.1 mL 16.7% $H_2O_2$ Day 94—0.5 mL 160 mM $FeSO_4$+0.63 mL 2% $Na_2SO_4$ Day 171—0.08 mL 25% $H_2O_2$+0.27 mL 10% Difco yeast extract+0.4 mL 160 mM $FeSO_4$+0.5 mL 2% $Na_2SO_4$ Days 185, 196, 209—0.08 mL 25% $H_2O_2$+0.27 mL 10% Difco yeast extract Days 223, 238, 259, 274—0.021 mL 25% $H_2O_2$+0.075 mL 10% Difco yeast extract A control incubation from the same site allowed changes occurring in the absence of nutrient stimulation to be evaluated. The control was handled in exactly the same manner as the experimental incubation except no nutrient additions were made.

Control: 500 ml total volume at start of incubation

Day 0—0.5 mL autoclaved 10% soil slurry

III. Results

Figure 3:
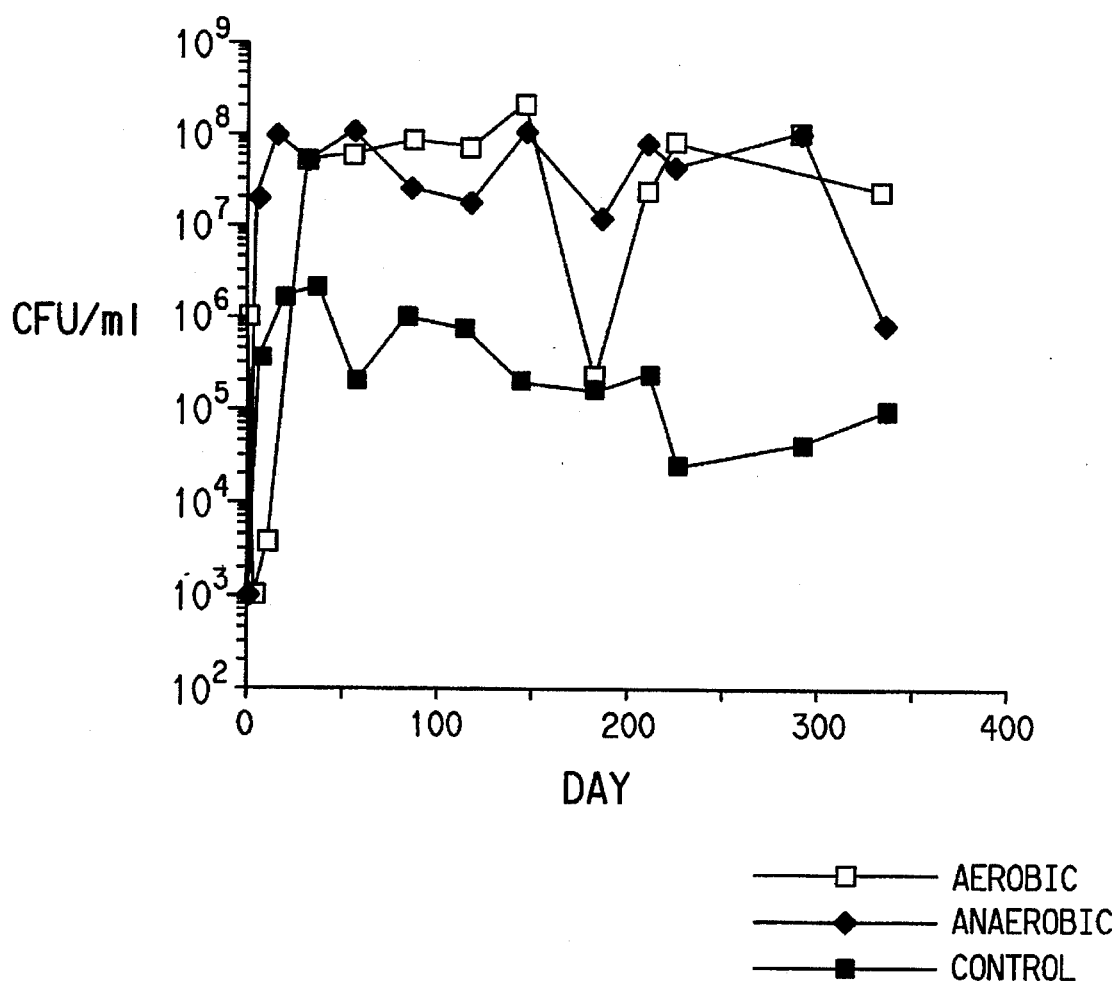
FIG. 3 shows changes in microbial cell numbers in contaminated ground water and soil taken from site B, an industrial site in Texas contaminated with tetraethyllead. These microbial cells were stimulated with the nutrient mixture and incubations were done in the laboratory.

The effect of nutrient stimulation on bacterial numbers in the incubation is seen in FIG. 3. Bacterial levels for the amended samples reached levels of between $10^7$ and $10^8$ CFU while the unamended samples only reached levels of between $5 \times 10^4$ to $10^6$ CFU.

Figure 4A:
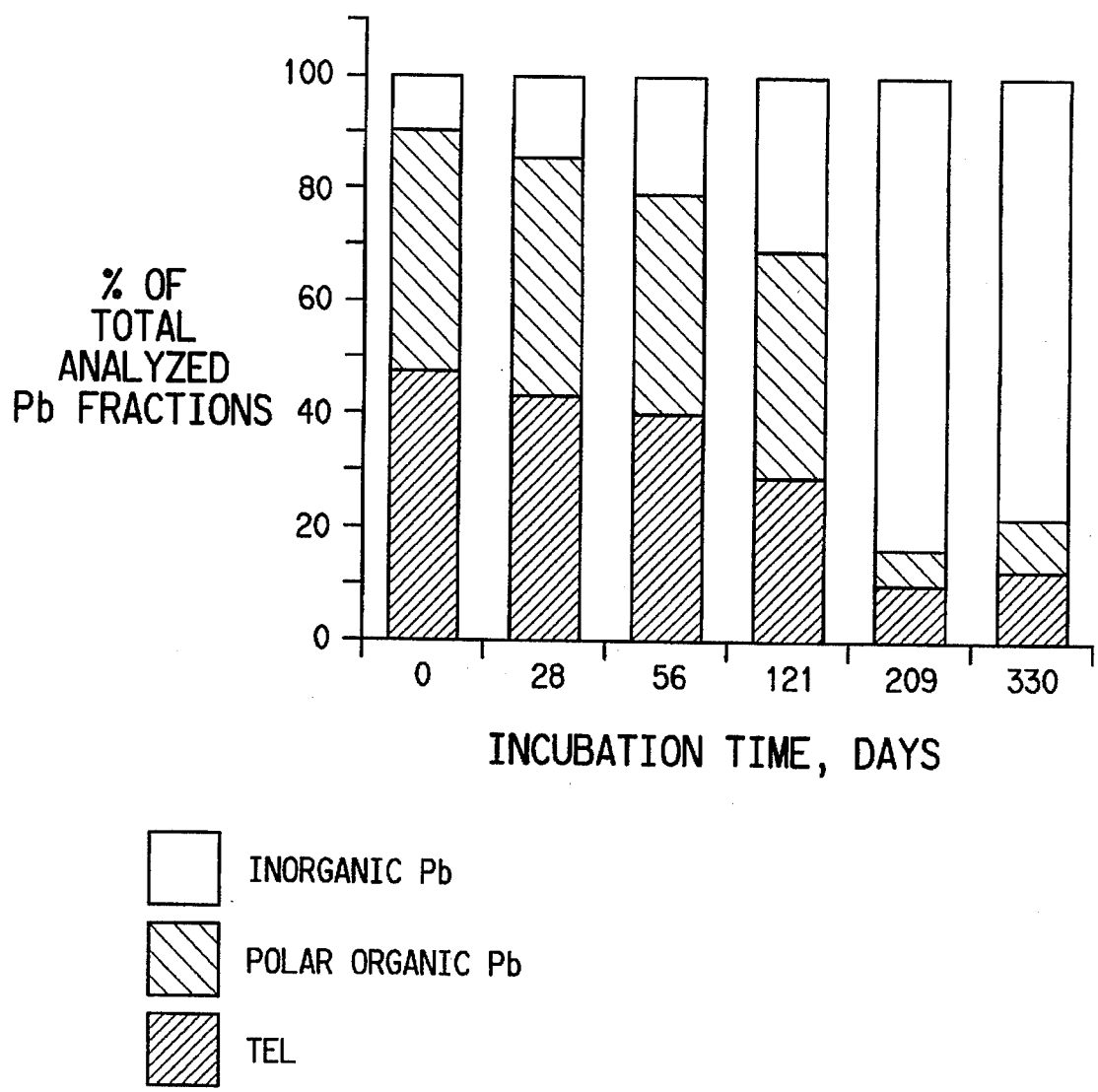
FIG. 4a shows the effect of a stimulated microbial population under aerobic conditions on the distribution of lead in organic and inorganic fractions over time in TEL contaminated ground water and subsoil taken from site B.

In this aerobic treatment, the percentage of total lead contributed by tetraethyllead declined more than six-fold from 46% to 7% (FIG. 4a). Polar organic lead declined as well from 43% to 15% (FIG. 4a). The percentage of total lead as inorganic lead increased seven fold from 11% to 77% (FIG. 4a).

Figure 4B:
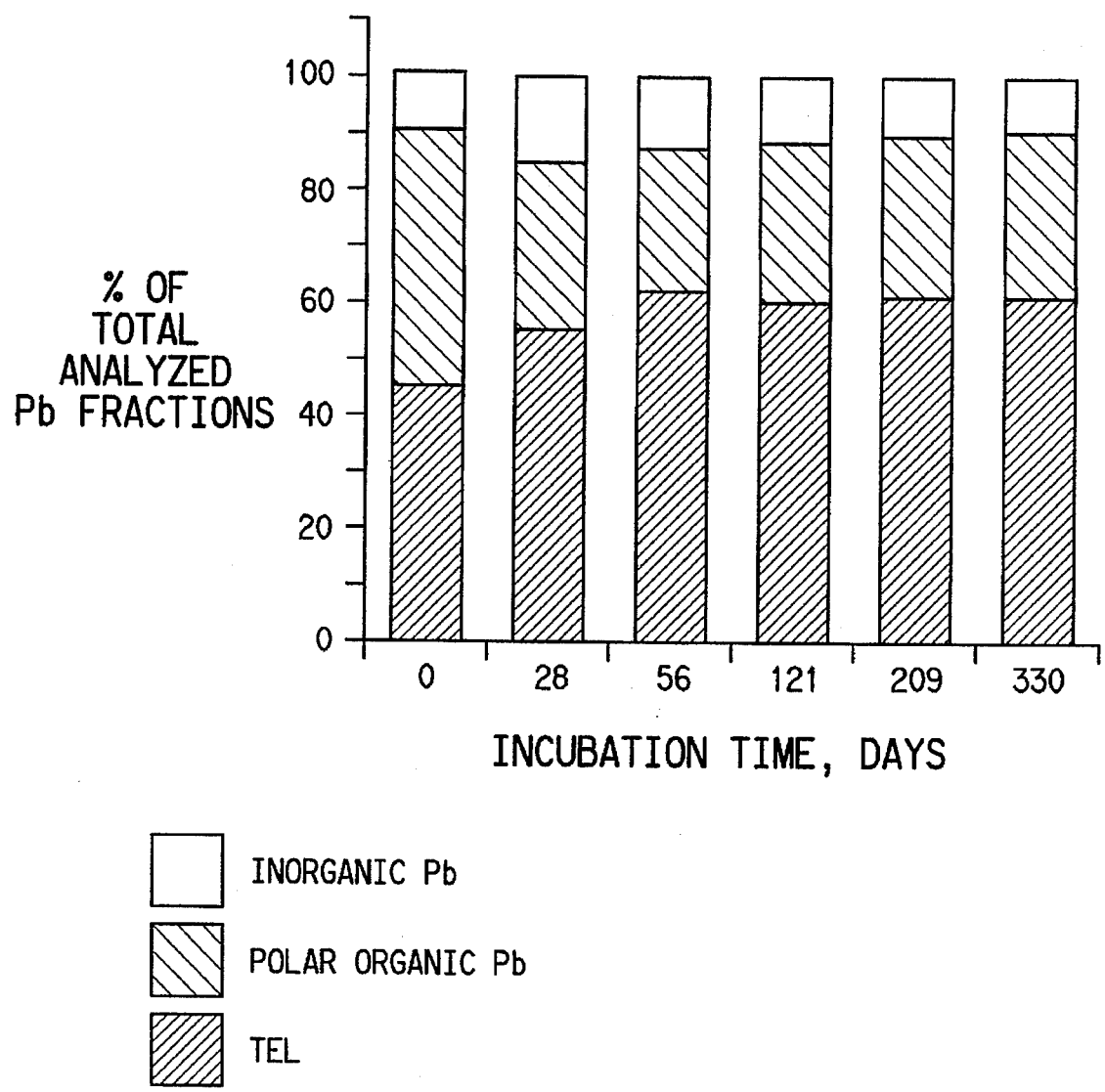
FIG. 4b shows the effect of an unstimulated microbial population on the distribution of lead in organic and inorganic fractions over time in TEL contaminated ground water and subsoil taken from site B.

The relative changes in the distribution of lead fractions are noticeably less in the control sample where nutrient stimulation is absent (FIG. 4b). Here the percentage of total lead contributed by tetraethyllead increased from 44% to 60.9% while polar organic lead declined from 47% to 28.1% (FIG. 4b) The percentage of total lead as inorganic lead increased from 9.7% to 10.1% (FIG. 4b).

EXAMPLE 3

Anaerobic Laboratory Microcosm with Site A Ground Water & Soil

I. Sample Collection

Samples of ground water with a small amount of subsoil were collected from a site where ground water and soil was contaminated with tetraethyllead. Lead measurements were made at day 0 and periodically throughout the incubation as set forth in Example 1, Step II.

II. Incubation and Pulsed Addition of Nutrients

Various nutrient mixture additions were made at the start of the laboratory incubation and periodically over the incubation period.

500 ml total volume at start of incubation

Day 0—1 mL sterile 7% (w/v) $NaH_2PO_4$ solution+1 mL 7% (w/v) $NH_4Cl$ solution+1 mL 10% (w/v) Difco yeast extract+0.5 mL of a 10% (w/v) garden soil slurry+2 mL Sodium lactate solution Day 7—45 mL 10% (w/v) Difco yeast extract Day 28, Day 70—1 mL 10% (w/v) Difco yeast extract+2 mL Sodium lactate solution In addition, the air over the water/soil incubation was replaced by a nitrogen/hydrogen (95:5, v:v) atmosphere to allow development of anaerobic microbial species. The ground water with a small amount of subsoil, was incubated under static conditions in a glass container in the dark at room temperature for 84 days.

A control incubation from the same site allowed changes occurring in the absence of nutrient stimulation to be evaluated. The control was the same as that used in Example 1.

Control: 500 ml total volume at start of incubation

Day 0—0.5 mL of sterilized 10% garden soil slurry

III. Results

As shown in FIG. 1, bacterial numbers attained levels of between $10^8$ and $10^9$ colony forming units (CFU) for amended cultures while only attaining levels of about $10^6$ CFU for unamended cultures.

Figure 5A:
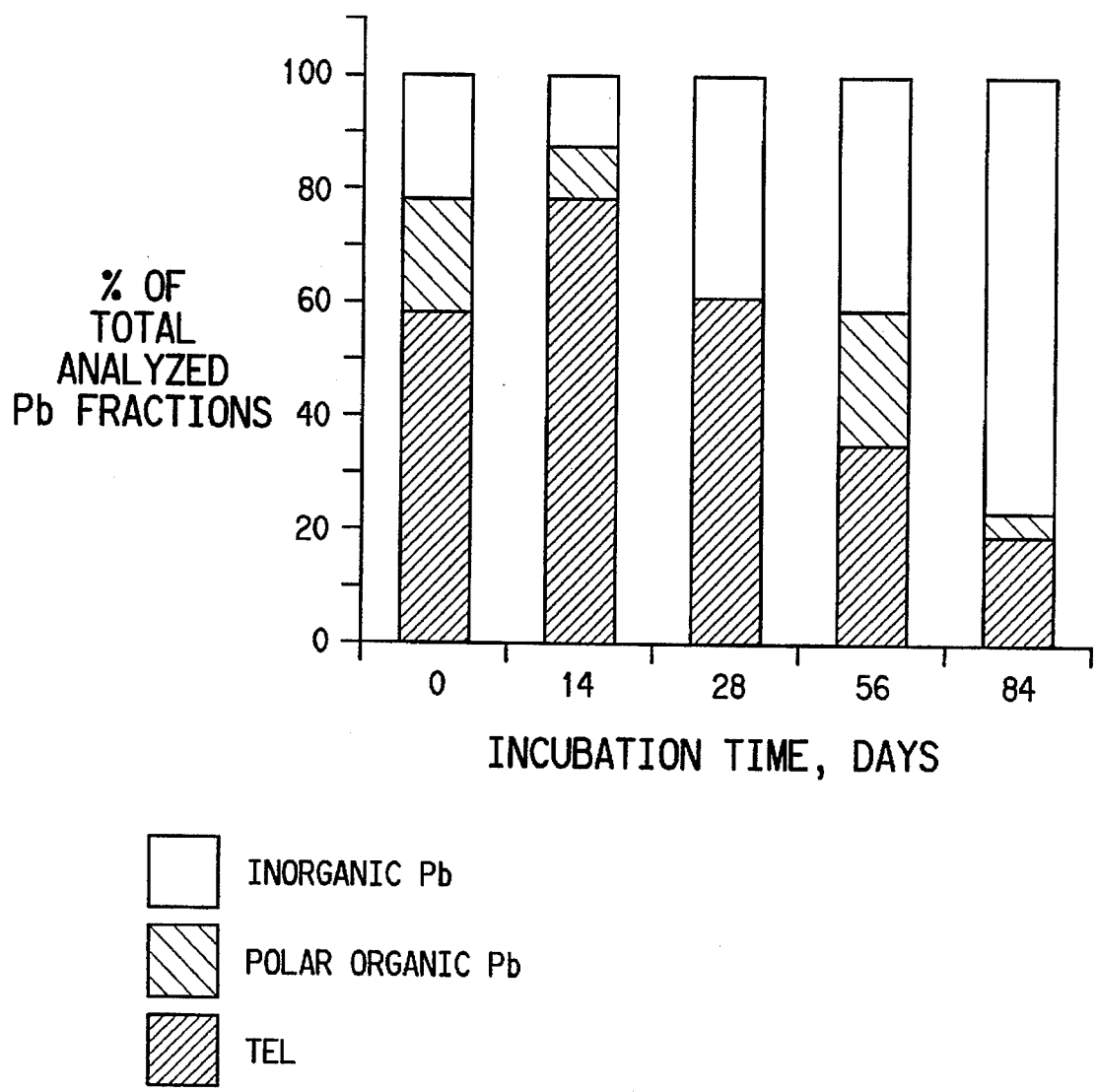
FIG. 5a shows the effect of a stimulated microbial population under anaerobic conditions on the distribution of lead in organic and inorganic fractions over time in TEL contaminated ground water and subsoil taken from site A.

In the anaerobic treatment, the percentage of total lead contributed by tetraethyllead declined more than three-fold from 57% to 18% (FIG. 5a). Polar organic lead declined as well from 19% to 6% (FIG. 5a). The percentage of total lead as inorganic lead increased more than three-fold from 24% to 76% (FIG. 5a).

Figure 5B:
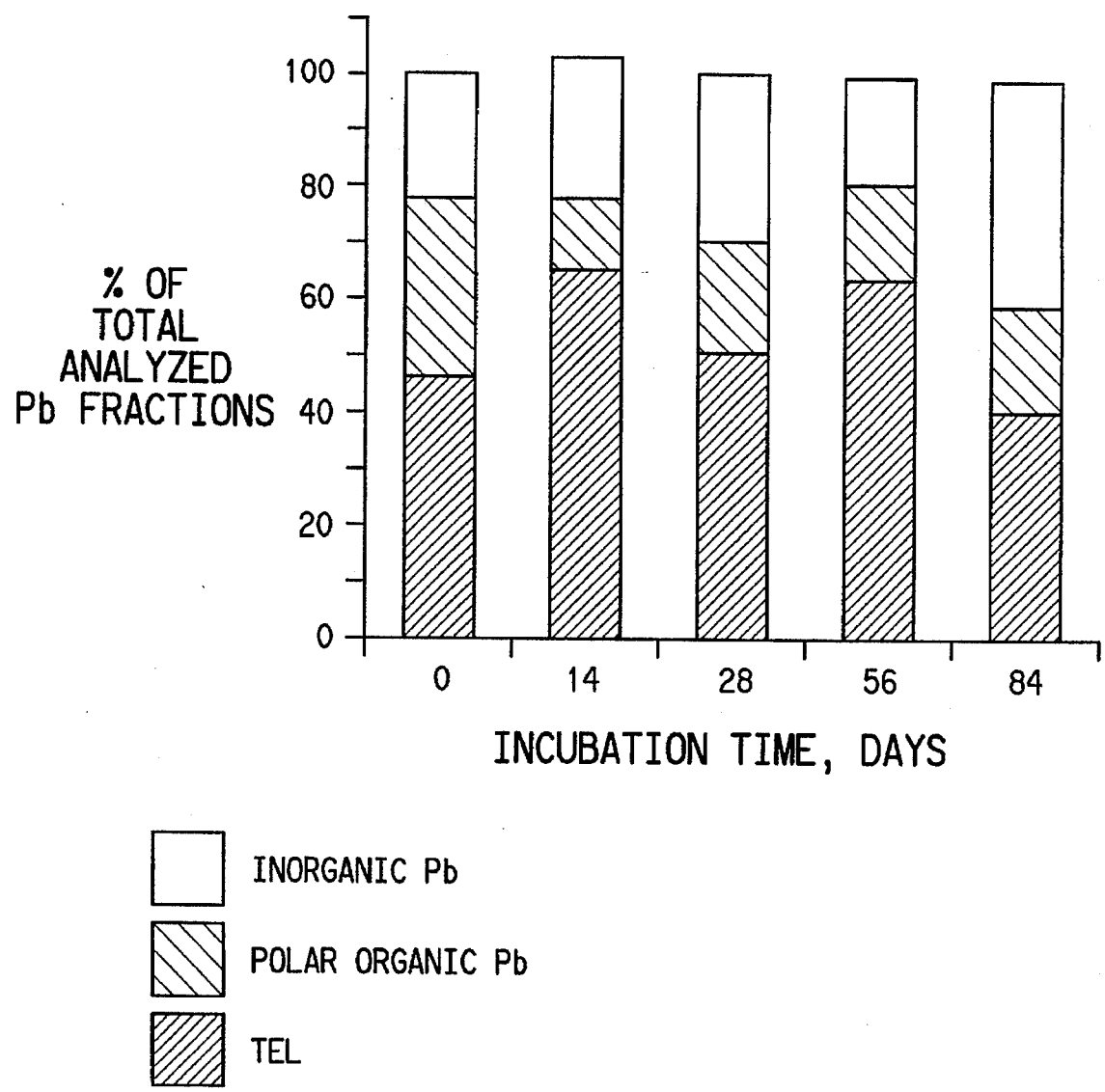
FIG. 5b shows the effect of an unstimulated microbial population on the distribution of lead in organic and inorganic fractions over time in TEL contaminated ground water and subsoil taken from site A.

The relative changes in the distribution of lead fractions are noticeably less in the control sample where nutrient mixture stimulation was absent (FIG. 5b). Here the percentage of total lead contributed by tetraethyllead declined from 46% to 40.5% while polar organic lead declined as well from 30.9% to 16.1% (FIG. 5b). The percentage of total lead as inorganic lead was seen to increase from 23% to 41.8% (FIG. 5b).

EXAMPLE 4

Anaerobic Laboratory Microcosm with Site B Ground Water & Soil

I. Sample Collection and Lead Fractionation

Samples of ground water with a small amount of subsoil were collected from a site where ground water was contaminated with tetraethyllead. Lead measurements were made at day 0 and periodically throughout the incubation as set forth in Example 1, Step II.

II. Incubation and Pulsed Addition of Nutrients

The ground water with a small amount of subsoil was incubated under static conditions in a glass container in the dark at room temperature for 330 days. Various nutrient additions, were made at the start of the laboratory incubation and periodically over the incubation period.

Nutrient Additions to Anaerobic 500 ml total volume at start of incubation

Day 0—1 mL 7% $NaH_2PO_4$+1 mL 7% $NH_4Cl$+10 mL 10% yeast extract+0.5 mL 10% soil slurry+2 mL 10% Sodium lactate to 500 mL well water sample Day 14—10 mL 10% Difco yeast extract Day 20—10 mL 10% Difco yeast extract+30 µL 2% methylene blue Days 28, 121, 136, 147—1 mL 10% Difco yeast extract+2 mL 10% Sodium lactate Days 56, 84—1 mL 10% Difco yeast extract Day 94—0.7 mL 160 mM $FeSO_4$+0.8 mL 2% $Na_2SO_4$ Day 171—1 mL 10% Difco yeast extract+2 mL 10% Sodium lactate+0.7 mL 160 mM $FeSO_4$+0.8 mL 2% $Na_2SO_4$ Days 185, 186—0.56 mL 10% Difco yeast extract Day 209—0.56 mL 10% Difco yeast extract+1.12 mL 10% Sodium lactate Day 223—0.46 mL 10% Difco yeast extract+0.92 mL 10% Sodium lactate Day 238—0.46 mL 10% Difco yeast extract+0.92 mL 10% Sodium lactate Day 259—0.46 mL 10% Difco yeast extract+0.92 mL 10% Sodium lactate Day 274—0.46 mL 10% Difco yeast extract+0.92 mL 10% Sodium lactate In addition, the air over the water/soil incubation was replaced by a nitrogen/hydrogen (95:5, v:v) atmosphere to allow development of anaerobic microbial species. ASTM Method D 4412-84 (Standard Water-formed Deposits) (ASTM Standards on Materials and Environmental Microbiology, 1st eds. (1987), pp. 119-121) was used yielding data showing that sulfate-reducing bacteria were observed to be present at $\geq 1,000$ cells/mL during the anaerobic treatment of Site B.

A control incubation from the same site allowed changes occurring in the absence of nutrient stimulation to be evaluated. The control was the same as that used in Example 3.

Control: 500 ml total volume at start of incubation

Day 0—0.5 mL autoclaved 10% soil slurry

III. Results

The effect of nutrient stimulation on bacterial numbers in the incubation is seen in FIG. 4. Bacterial levels for the amended samples reached levels of between $10^7$ and $10^8$ CFU while the unamended samples only reached levels of between $5 \times 10^4$ to $10^6$ CFU.

In the anaerobic treatment, the percentage of total lead contributed by tetraethyllead declined from 55% to 30% (FIG. 6a). Polar organic lead declined as well from 32% to 10% (FIG. 6a). The percentage of total lead as inorganic lead increased more than four-fold from 13% to 60% (FIG. 6a).

Figure 6B:
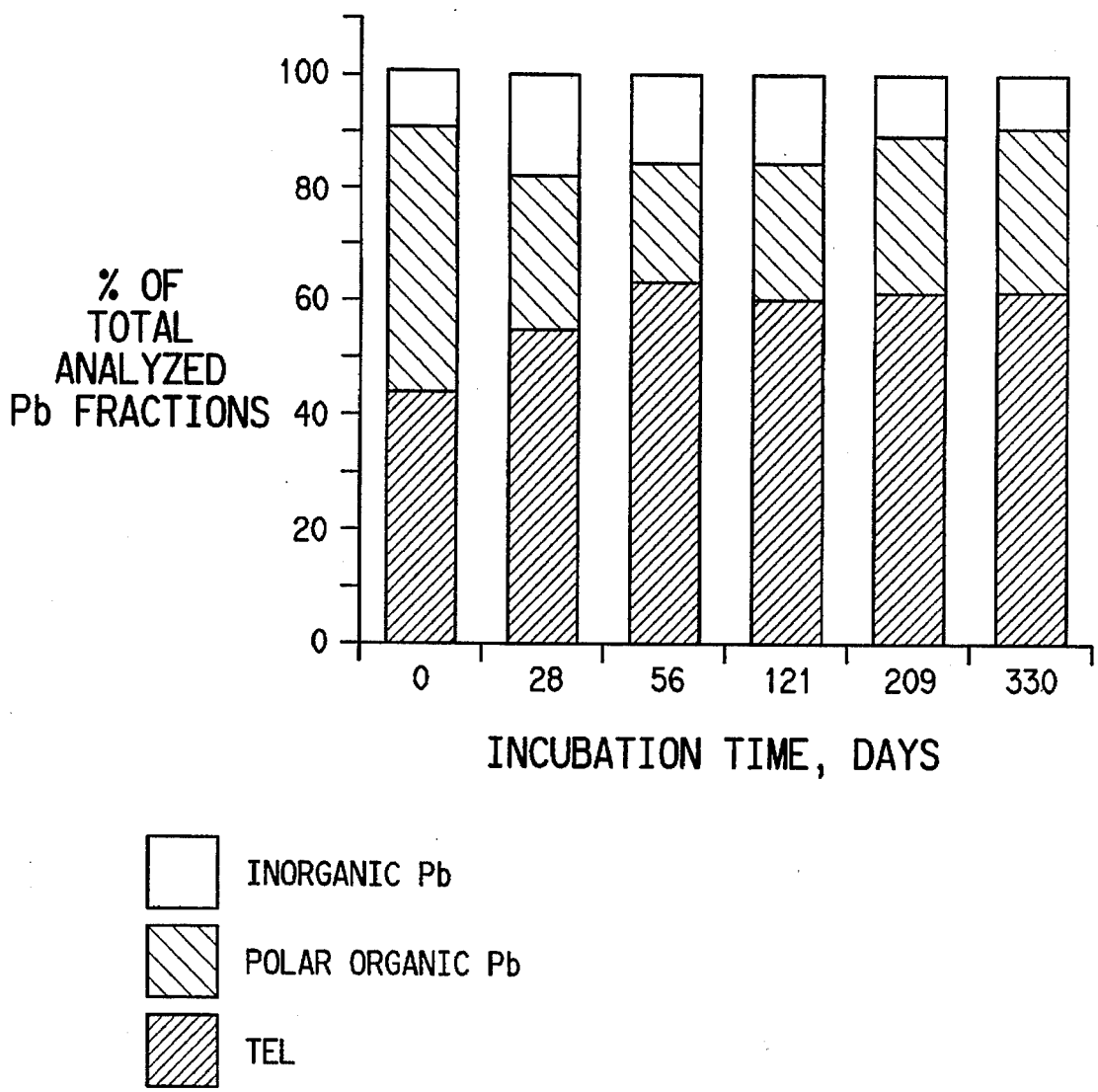
FIG. 6b shows the effect of an unstimulated microbial population on the distribution of lead in Organic and inorganic fractions over time in TEL contaminated ground water and subsoil taken from site B.

The relative changes in the distribution of lead fractions are noticeably less in the control sample where nutrient mixture stimulation was absent (FIG. 6b). Here the percentage of total lead contributed by tetraethyllead increased from 44% to 60.9% while polar organic lead declined as well from 47% to 28.1% (FIG. 6b). The percentage of total lead as inorganic lead increased from 9.7% to 10.1% (FIG. 6b).

EXAMPLE 5

Application of Technology to Full Scale Field Site—Aerobic Embodiment

The techniques demonstrated in Examples 1-4 above can be used in field situations where organoleads are to be removed from subsoil and ground water supplies.

An essentially circular piece of land approximately 3 acres in area with a ground water supply (approximately 3.1 million cubic ft.) is contaminated with tetraethyllead (approximately 10,000 lbs) resulting from loss during process handling. On the periphery of the contaminated plot ten wells are established as injection wells by erecting a mixture tank and providing an air pump, conduit and sparger at each well. In the central portion of the area one well is established as a producing well by setting up a high capacity pump and conduit.

Air is pumped continually into each injection well through a porous sparger at a rate of 3.5 cu. ft. per minute. At each injection well the mixture tank is filled with a solution consisting of 100 parts yeast extract, 54 parts $NaH_2PO_4$, 108 parts $NaHPO_4$, 126 parts $NH_4Cl$ and 612 parts water. When the well is activated, the nutrient mixture solution is injected into the well at a rate of 20 gallons per hour. The injection wells are activated for 24 hours every 14 days. The producing well is continuously expressed at 400,000 gallons per day.

Water movement resulting from removal of water at the producing well allows the pulsed nutrient mixture to enter the contaminated subsoil/ground water. Each pulsed nutrient addition results in the production of approximately 88 lbs. of microbial cells. Oxygen is maintained in the aquifer by continuous air sparging at the injection wells. The pulsing process is continued for approximately 500 days. During this period, the stimulation of the microbial flora by nutrient mixture pulses results in the reduction of tetraethyllead and polar organic lead concentrations in the ground water supply and surrounding subsoil.

EXAMPLE 6

Application of Technology to Full Scale Field Site—Anaerobic Embodiment

The techniques demonstrated in Examples 1-4 above can be used in field situations where organolead are to be removed from subsoil and ground water supplies.

An essentially circular piece of land approximately 3 acres in area with a ground water supply (approximately 3.1 million cubic ft.) is contaminated with tetraethyllead (approximately 10,000 lbs) resulting from loss during process handling. On the periphery of the contaminated plot ten wells are established as injection wells by erecting a mixture tank and conduit at each well. In the central portion of the area one well is established as a producing well by setting up a high capacity pump and conduit. Analysis for sulfate concentrations in the ground water show that natural sulfate concentrations are approximately 150 ppm (*Standard Methods for the Examination of Water and Wastewater*, 1985, 16th Edition, Section 426C).

At each injection well the mixture tank is filled with a solution consisting of 100 parts yeast extract, 54 parts $NaH_2PO_4$, 108 parts $NaHPO_4$, 126 parts $NH_4Cl$ and 612 parts of a 4% sodium lactate solution in water. When the well is activated, the nutrient mixture solution is injected into the well at a rate of 50 gallons per hour. The injection wells are activated for 24 hours every 14 days. The producing well is continuously expressed at 400,000 gallons per day.

Water movement resulting from removal of water at the producing well allows the pulsed nutrient mixture to enter the contaminated subsoil/ground water. Each pulsed nutrient addition results in the production of approximately 22 lbs. of microbial cells and bacterial sulfide production from naturally occurring sulfate. The pulsing process is continued for approximately 1000 days. During this period, the stimulation of the microbial flora by nutrient mixture pulses and formation of sulfide by sulfate reducing bacteria result in the reduction of tetraethyllead and polar organic lead concentrations in the ground water supply and surrounding subsoil.

From the foregoing description, one skilled in the art can easily ascertain the essential characteristics of this invention, and, without departing from the spirit and scope thereof, can make various changes and modifications to the invention to adapt it to various usages and conditions.

What is claimed is:

1. A method of reducing the concentrations of organolead species in a contaminated medium containing organolead comprising the steps of:
   (i) determining the starting concentration of indigenous anaerobic microorganisms comprising sulfate reducing bacteria in the contaminated medium wherein said starting concentrations range from about 1 to 100,000 CFU/ml; and
   (ii) stimulating the growth of the indigenous anaerobic microorganisms by adding an initial addition of an effective amount of nutrients, the nutrients selected from the group consisting of a carbon source wherein said carbon source is present at a concentration of about 3–3000 ppm, a nitrogen source wherein said nitrogen source is present at a concentration of about 0.26–26 mM, a phosphate source wherein said phosphate source is present at a concentration of about 0.09–90 mM and a sulfate source wherein said sulfate source is present at a concentration of about 50 ppm and wherein said sulfate source is not an oxygen source such that the indigenous microorganisms reach a concentration of from 1000 to 100,000 times that of the starting concentration and wherein the concentration of sulfate reducing bacteria is enhanced to a concentration equal to or greater than 1,000 cells/ml and the permeability of the contaminated medium is greater than or equal to $10^{-4}$ cm/second permitting waterflow whereby the microorganisms degrade the organolead species to inorganic lead salts.

2. The method of claim 1 further comprising adding a supplemental addition of an effective amount of nutrients at a pulsed frequency of between about 3 days and 3 months after the initial addition of nutrients until the organolead concentration of the contaminated medium reaches a level lower than that of the starting concentration.

3. The method of claim 1 wherein the organolead is selected from the group consisting of tetraethyllead, triethylmethyllead and dilead alkyl.

4. The method of claim 1 wherein the contaminated medium is an underground water supply.

5. The method of claim 1 wherein the carbon source is a complex organic mixture derived from biological material.

6. The method of claim 5 wherein the carbon complex organic mixture is yeast extract.

7. The method of claim 1 wherein the effective amount of the carbon source results in a concentration of the carbon source in the contaminated medium of from about 2 to about 20,000 parts per million.

8. The method of claim 7 wherein the effective amount of the carbon source results in a concentration of the carbon source in the contaminated medium of from about 10 to about 200 parts per million.

9. The method of claim 1 wherein the nitrogen source is ammonium chloride.

10. The method of claim 1 wherein the effective amount of the nitrogen source results in a concentration in the contaminated medium of nitrogen from about 0.26 to about 260 mM.

11. method of claim 10 wherein the effective amount of the nitrogen source results in a concentration in the contaminated medium of nitrogen from about 2.0 to about 4.0 mM.

12. The method of claim 1 wherein the phosphate source is sodium dihydrogen phosphate.

13. The method of claim 1 wherein the effective amount of the phosphate source results in a concentration in the contaminated medium of phosphate from about 0.09 to about 90 nM.

14. The method of claim 13 wherein the effective amount of the phosphate source results in a concentration in the contaminated medium of phosphate from about 0.7 to about 2.0 mM.

15. The method of claim 1 wherein the nutrient further comprises a supplemental carbon source to favor the growth and metabolic activity of the anaerobic sulfate reducing bacteria over that of other indigenous microorganisms selected from the group consisting of lactic acid, pyruvic acid, fumaric acid, malic acid, citric acid, propionic acid, butyric acid, caproic acid, benzoic acid, succinic acid, the salt of each such acid, ethanol, and glucose.

16. The method of claim 15 wherein the effective amount of lactic acid or of the salt of lactic acid results in a concentration of from about 3 to about 3,000 parts per million in the contaminated medium.

17. The method of claim 16 wherein the effective amount of lactic acid or of sodium lactate results in a concentration of from about 100 to about 400 parts per million in the contaminated medium.

18. The method of claim 1 wherein the sulfate source is ferrous sulfate.

19. The method of claim 18 wherein the effective amount of the sulfate source results in a concentration of about 10 to about 100 parts per million in the contaminated medium.

20. The method of claim 19 wherein the effective amount of the sulfate source results in a concentration of about 30 to about 60 parts per million in the contaminated medium.

21. A method for the degradation of tetraethyl lead in a soil to inorganic lead salts, wherein said soil contains sulfate reducing bacteria, said soil being contaminated with tetraethyl lead comprising the steps of:
   (i) stimulating the growth of sulfate reducing bacteria by amending said soil with:
      (a) a carbon source selected from the group consisting of yeast extract, lactic acid, pyruvic acid, fumaric acid, malic acid, citric acid, propionic acid, butyric acid, caproic acid, benzoic acid, succinic acid, the salt of each such acid, ethanol, and glucose; and wherein said carbon source is present at a concentration of about 2 to 20,000 parts per million in said soil;
      (b) a nitrogen source wherein said nitrogen source is present at a concentration of about 0.26 to about 260 millimolar;
      (c) a phosphate source wherein said phosphate source is present at a concentration of about 30 to 300 parts per million in said soil;
      (d) a sulfate source wherein said sulfate source is present at a concentration of about 10 to 100 parts per million in said soil;
   (ii) repeating the amendments of step (i) at a pulsed frequency of about 3 days to 3 months after the initial amendments of step (i);
   wherein after step (ii) is completed the tetraethy lead in said soil is degraded to inorganic lead salts.

22. The method of claim 21 wherein said nitrogen source is ammonium chloride.

23. The method of claim 21 wherein said phosphate source is sodium dihydrogen phosphate.

24. The method of claim 21 wherein said sulfate source is ferrous sulfate.

* * * * *